（12） United States Patent
Seo et al.

(10) Patent No.: US 9,354,840 B2
(45) Date of Patent: May 31, 2016

(54) AUTOMATIC DETECTION METHOD OF VIDEO WALL ARRANGEMENT AND VIDEO WALL SYSTEM USING THE SAME

(71) Applicant: SAMSUNG ELECTRONICS CO., LTD., Suwon-si (KR)

(72) Inventors: Jeong-ryeol Seo, Seongnam-si (KR); Young-kook Kim, Seongnam-si (KR); Hyun-ah Kim, Incheon (KR); Ji-eun Park, Suwon-si (KR); Jin-Ho Son, Hanam-si (KR); Seung-hun Lee, Anyang-si (KR); Ki-seok Choi, Osan-si (KR); Won-yong Choi, Seoul (KR); Yun-suk Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 265 days.

(21) Appl. No.: 13/710,734

(22) Filed: Dec. 11, 2012

(65) Prior Publication Data

US 2013/0293443 A1    Nov. 7, 2013

(30) Foreign Application Priority Data

May 4, 2012    (KR) .......................... 10-2012-0047737

(51) Int. Cl.
*G06F 3/14* (2006.01)
*G06F 3/147* (2006.01)

(52) U.S. Cl.
CPC .............. *G06F 3/1446* (2013.01); *G06F 3/147* (2013.01); *G09G 2360/04* (2013.01); *G09G 2370/04* (2013.01); *G09G 2370/042* (2013.01)

(58) Field of Classification Search
CPC ... G06F 3/1446; G06F 3/147; G09G 2360/04; G09G 2370/04; G09G 2370/042
USPC ........................................................ 345/1.2
See application file for complete search history.

(56) References Cited

U.S. PATENT DOCUMENTS

| 6,323,854 | B1 * | 11/2001 | Knox et al. | 345/418 |
| 6,593,902 | B1 * | 7/2003 | Ogino et al. | 345/55 |
| 2008/0285087 | A1 * | 11/2008 | Perkins et al. | 358/400 |
| 2011/0122048 | A1 * | 5/2011 | Choi et al. | 345/1.1 |
| 2011/0140991 | A1 * | 6/2011 | Brenneman et al. | 345/1.3 |

FOREIGN PATENT DOCUMENTS

| EP | 2 328 073 A2 | 6/2011 |
| JP | 2007164060 A | 6/2007 |
| KR | 1020110138007 A | 12/2011 |

OTHER PUBLICATIONS

Communication, dated May 13, 2013, issued by the European Patent Office in counterpart European Patent Application No. 13153772.2.

* cited by examiner

*Primary Examiner* — Viet Pham
(74) *Attorney, Agent, or Firm* — Sughrue Mion, PLLC

(57) ABSTRACT

An automatic detection method of an arrangement of a video wall including a plurality of monitors and a video wall system are provided. The method includes: calling, by a control computer, identification information of a first monitor of the plurality of monitors; sending, by the first monitor, a response signal to the control computer and sending, by a second monitor which does not correspond to the called identification information, a detecting signal including a received direction of the response signal to the control computer; and receiving, by the control computer, the detecting signal, and determining the arrangement of the plurality of monitors according to the received detecting signal.

25 Claims, 10 Drawing Sheets

AUTOMATIC DETECTION METHOD OF VIDEO WALL ARRANGEMENT AND VIDEO WALL SYSTEM USING THE SAME

CROSS-REFERENCE TO RELATED APPLICATION

This application claims priority under 35 U.S.C. §119(a) from Korean Patent Application No. 10-2012-0047737, filed May 4, 2012 in the Korean Intellectual Property Office, the disclosure of which is incorporated herein by reference in its entirety.

BACKGROUND

1. Field

Apparatuses and methods consistent with exemplary embodiments relate to a video wall system including a plurality of monitors and, more particularly, to an automatic detection method of a video wall arrangement which can automatically detect arrangement and identification numbers of a plurality of monitors of a video wall and a video wall system using the automatic detection method.

2. Description of the Related Art

Generally, a video wall refers to an apparatus including a plurality of monitors which are arranged on a plane and respectively display different portions of one image so that the plurality of monitors can work as one monitor having a large-sized screen.

The plurality of monitors of the video wall is connected to a control computer. The control computer controls a display state of each of the plurality of monitors. Accordingly, a user can easily control a monitor which needs to be adjusted among the plurality of monitors using the control computer.

However, when constructing the video wall, after the user installs the plurality of monitors in a video wall shape and connects the plurality of monitors with each other with cables, the user needs to check an identification number of each of the plurality of monitors of the video wall. After the user matches each of the identification numbers to a location of each of the plurality of monitors one-to-one, the user saves the relationship between the identification numbers and the locations of the monitors on the control computer. Then, the user can individually control the plurality of monitors using the control computer.

However, in the related art video wall system, only when the user checks one-by-one the identification numbers of the plurality of monitors of the video wall and knows locations of the monitors corresponding to the identification numbers, can the user use the control computer to individually adjust the plurality of monitors. Therefore, installation of the video wall system is not easy.

SUMMARY

Exemplary embodiments have been developed in order to overcome the above drawbacks and other problems associated with the related art arrangement. An aspect of an exemplary embodiment relates to an automatic detection method of a video wall arrangement that does not need to manually set a relationship between identification numbers and locations of a plurality of monitors of a video wall and can automatically detect relationships between identification numbers and locations of the plurality of monitors, and a video wall system using the same.

Further, an aspect of another exemplary embodiment relates to an automatic detection method of a video wall arrangement that can automatically recognize a configuration of a video wall including a plurality of monitors and a video wall system using the same.

According to an aspect of an exemplary embodiment, there is provided an automatic detection method of an arrangement of a video wall including a plurality of monitors, the method including: calling, by a control computer, identification information of a first monitor among the plurality of monitors; sending, by the first monitor, a response signal to the control computer and sending, by a second monitor that does not correspond to the called identification information among the plurality of monitors, a detecting signal including a received direction of the response signal to the control computer; and receiving, by the control computer, the detecting signal, and determining the arrangement of the plurality of monitors according to the received detecting signal.

Each of the plurality of monitors may include: a control portion to control the monitor; and four detecting members disposed on four side surfaces of the monitor, wherein the control portion of the first monitor corresponding to the identification information sends the response signal through the four detecting members.

The control portions of the other monitors which do not correspond to the identification information among the plurality of monitors may determine whether or not the response signal enters through the four detecting members, and, if the response signal enters from one of the four detecting members, send location information of the detecting member through which the response signal enters to the control computer.

The detecting signal may include identification information of the second monitor and the location information of the detecting member through which the response signal enters.

A monitor which does not receive the response signal from among the plurality of monitors may not send the detecting signal.

The response signal may include a high pulse signal.

According to an aspect of another exemplary embodiment, there is provided an automatic detection method of a video wall arrangement for a video wall system including a plurality of monitors and a control computer, the method including: a) calling, by the control computer, identification information of a first monitor among the plurality of monitors; b) calling, by the first monitor corresponding to the identification information, a response signal through four detecting members disposed on four side surfaces of the first monitor; c) detecting, by other monitors which do not correspond to the identification information, whether the response signal enters through four detecting members disposed on four side surfaces of each of the other monitors and sending detecting signals comprising detecting results to the control computer; d) receiving, by the control computer, the detecting signals sent from the plurality of monitors; e) sequentially repeating the steps of a), b), c) and d) for a plurality of identification information corresponding to the plurality of monitors to receive the detecting signals; and f) after all the plurality of identification information corresponding to the plurality of monitors is called, determining, the control computer, the arrangement of the plurality of monitors based on the plurality of received detecting signals.

A monitor which does not correspond to the identification information among the plurality of monitors may determine a detecting member through which the response signal enters of the four detecting members, and send location information of the detecting member through which the response signal enters to the control computer.

The control computer may use the identification information of the monitor and the location information of the detecting member included in the detecting signal to determine the arrangement of the plurality of monitors.

According to an aspect of another exemplary embodiment, there is provided a video wall system including: a plurality of monitors constituting a video wall; and a control computer to control the plurality of monitors, wherein each of the plurality of monitors may include a control portion to control the monitor; and four detecting members disposed on four side surfaces of the monitor, wherein the control computer sequentially sends identification information of each of the plurality of monitors to the plurality of monitors, a monitor corresponding to the identification information among the plurality of monitors sends a response signal through the four detecting members, and a monitor which does not correspond to the identification information among the plurality of monitors detects the response signal and sends a detecting signal including location information of the monitor corresponding to the identification information to the control computer.

The control portion of the monitor which does not correspond to the identification information among the plurality of monitors may determine whether or not the response signal enters through the four detecting members, and, if the response signal enters from one of the four detecting members, send the detecting signal including location information of the detecting member through which the response signal enters to the control computer.

The detecting signal may include the identification information of the monitor and the location information of the detecting member through which the response signal enters.

A monitor which does not receive the response signal among the plurality of monitors may not send the detecting signal.

The detecting member may be provided in an individual connector separated from connectors for video/audio signals and monitor control signals.

The detecting member may be provided integrally with at least one of connectors for video/audio signals and monitor control signals.

At least two detecting members among the four detecting members may be disposed in connectors which can move horizontally or vertically.

According to an aspect of another exemplary embodiment, there is provided an automatic detection method of an arrangement of a video wall including a plurality of monitors, the automatic detection method including: calling, by a control computer, identification information of a first monitor, from among the plurality of monitors; receiving, by the control computer, a detecting signal from a second monitor, from among the plurality of monitors, that does not correspond to the called identification information, the detecting signal indicating a received direction of a response signal received by the second monitor from the first monitor in response to the calling; and determining an arrangement of the plurality of monitors according to the received detecting signal.

According to an aspect of another exemplary embodiment, there is provided an automatic detection method of an arrangement of a video wall including a plurality of monitors, the automatic detection method including: receiving, by a first monitor from a control computer, called identification information called by the control computer; in response to the called identification information corresponding to the first monitor, from among the plurality of monitors, sending, by the first monitor, a first response signal indicating that the called identification information corresponds to the first monitor; in response to the called identification information not corresponding to the first monitor, not sending, by the first monitor, the first response signal; and in response to receiving a second response signal from a second monitor, sending, to the control computer by the first monitor, a detecting signal indicating a received direction of the response signal by the first monitor from the second monitor, wherein the second response signal indicates that the called identification information corresponds to the second monitor.

Other objects, advantages and salient features of exemplary embodiments will become apparent from the following detailed description, which, taken in conjunction with the annexed drawings, discloses one or more exemplary embodiments.

BRIEF DESCRIPTION OF THE DRAWINGS

These and/or other aspects and advantages will become apparent and more readily appreciated from the following description of exemplary embodiments, taken in conjunction with the accompanying drawings of which.

Throughout the drawings, like reference numerals will be understood to refer to like parts, components and structures.

DETAILED DESCRIPTION OF EXEMPLARY EMBODIMENTS

Hereinafter, exemplary embodiments will be described in detail with reference to the accompanying drawings.

The matters defined herein, such as a detailed construction and elements thereof, are provided to assist in a comprehensive understanding of this description. Thus, it is apparent that exemplary embodiments may be carried out without those defined matters. Also, well-known functions or constructions are omitted to provide a clear and concise description of exemplary embodiments. Further, dimensions of various elements in the accompanying drawings may be arbitrarily increased or decreased for assisting in a comprehensive understanding.

Figure 1:
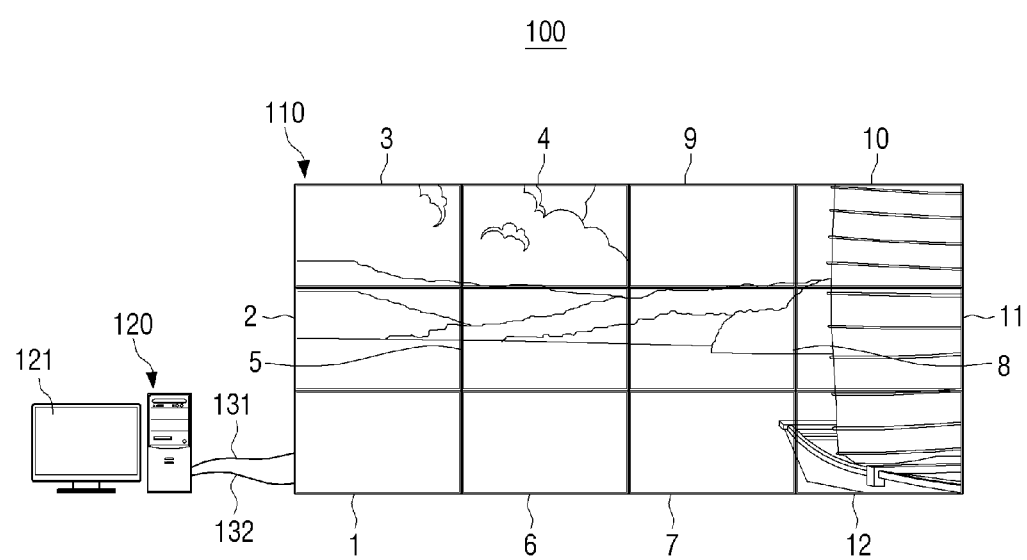
FIG. 1 is a front view schematically illustrating a video wall system according to an exemplary embodiment.
Figure 2:
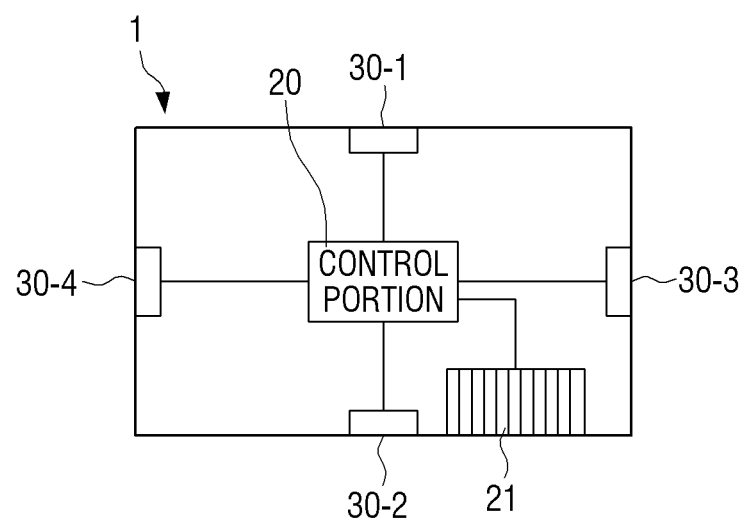
FIG. 2 is a view schematically illustrating an inner structure of a monitor of a video wall system according to an exemplary embodiment.

FIG. 1 is a front view schematically illustrating a video wall system according to an exemplary embodiment. FIG. 2 is a view schematically illustrating an inner structure of a monitor of a video wall system according to an exemplary embodiment.

Referring to FIG. 1, a video wall system 100 according to an exemplary embodiment may include a plurality of monitors 1 to 12 to constitute a video wall 110 and a control computer 120 to control the plurality of monitors 1 to 12.

The video wall 110 refers to an arrangement in which the plurality of monitors 1 to 12 are arranged on a plane so as to form a large screen. Since the plurality of monitors 1 to 12 of the video wall 110 are configured to display different portions of a single image, the video wall 110 can display images as a single large screen monitor.

The plurality of monitors 1 to 12 constituting the video wall 110 may be substantially in a rectangular shape, respectively. Furthermore, the plurality of monitors 1 to 12 constituting the video wall 110 may have the same specifications; therefore, the plurality of monitors 1 to 12 will be explained based on a first monitor 1 hereinafter.

A screen portion on which images are displayed is provided on a front surface of the monitor 1. An input-output terminal 21 may be disposed on a rear surface 1b of the monitor 1 or on any of the side surfaces of the monitor 1, that is, a left side surface, a right side surface, a top surface, and a bottom surface of the monitor 1. A control portion 20, which controls signals input into and output from the monitor 1 and images displayed on the screen portion, is provided inside the monitor 1. Here, the monitor 1 may include various apparatuses that can receive image signals from the control computer 120 and display images, such as a liquid crystal display (LCD) monitor, a light emitting device (LED) monitor, a cathode-ray tube (CRT) monitor, an organic light emitting device (OLED) monitor, etc.

Referring to FIG. 2, the input-output terminal 21 may include an input terminal and an output terminal for image (or video) signals, an input terminal and an output terminal for controlling the monitor, an input terminal and an output terminal for a remote controller, an input terminal and an output terminal for audio signals, etc. Further, the monitor 1 is provided with detecting terminals that can check connections of neighboring monitors 2 to 12. Additionally, the input-output terminal 21 can include various input and output terminals as necessary or desired.

The detecting terminals capable of checking the connections of the monitors 1 to 12 may include four detecting members 30-1, 30-2, 30-3 and 30-4 which are respectively disposed on the four side surfaces of the monitor 1, namely, a top surface, a bottom surface, a left side surface, and a right side surface of the monitor 1. The four detecting members 30-1, 30-2, 30-3 and 30-4 respectively detect whether other monitors 2 to 12 are disposed on the top surface, bottom surface, left side surface, and right side surface of the monitor 1. The detecting members 30-1, 30-2, 30-3 and 30-4 may use a female connector or a male connector having, for example, two pins. The female connector or male connector is electrically connected to the control portion 20. For example, one monitor 1 is provided with the female connectors as the detecting members 30-1, 30-2, 30-3 and 30-4, the neighboring monitor 2 is provided with the male connectors, and then, the female and male connectors of the two monitors 1 and 2 are connected with each other. In the present exemplary embodiment, the female connectors or male connectors are used as the detecting members 30-1, 30-2, 30-3 and 30-4. However, it is understood that one or more other exemplary embodiments are not limited thereto. For example, according to one or more other exemplary embodiments, the detecting members 30-1, 30-2, 30-3 and 30-4 may use any of various mechanisms, devices, methods, etc., to connect with other monitors disposed on the top, bottom, left, and right of the monitor 1, and receive and send signals from and to the other monitors.

Figure 3:
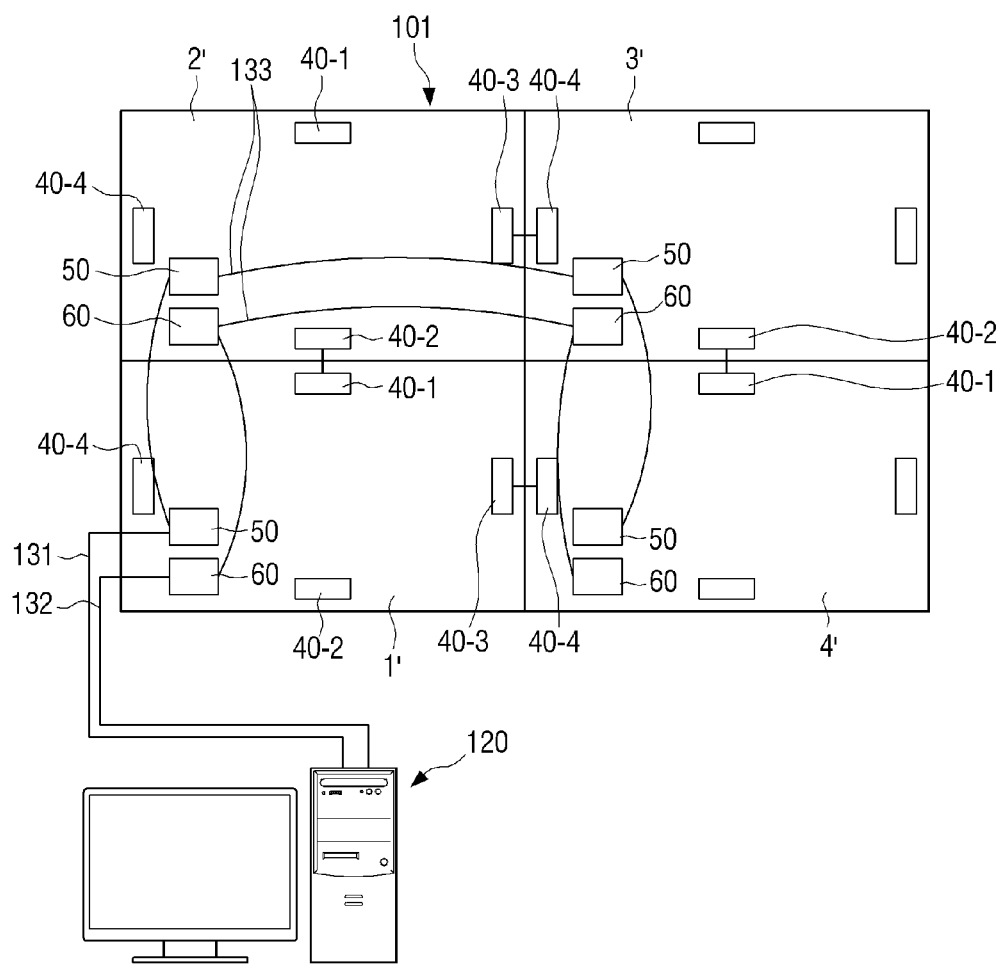
FIG. 3 is a rear view illustrating a video wall system using separate connectors as detecting members of a plurality of monitors of the video wall system, according to an exemplary embodiment.

FIG. 3 illustrates a video wall 101 including monitors 1', 2', 3' and 4' having a connector for a video signal and a connector for a detecting member which are provided separately from each other. Referring to FIG. 3, a video connector 50 including terminals for video signals and audio signals and a control connector 60 including terminals for monitor control signals are provided on a rear surface of the monitor 1'. Further, four detecting connectors 40-1, 40-2, 40-3 and 40-4 being used as the detecting member are provided on the top and bottom surfaces and the left and right side surfaces of the monitor 1'. The video connector 50 and the control connector 60 of a first monitor 1' among the four monitors 1', 2', 3' and 4' constituting the video wall 101 are connected to the control computer 120 by cables 131 and 132. The control connector 60 is connected to the control computer 120 using, for example, a RS-232C cable. The video connector 50 and the control connector 60 of the first monitor 1' are connected to the video connector 50 and the control connector 60 of a second monitor 2' using cables. Also, the video connector 50 and the control connector 60 of the second monitor 2' are connected to the video connector 50 and the control connector 60 of a third monitor 3' using cables 133, respectively. The video connector 50 and the control connector 60 of the third monitor 3' are connected to the video connector 50 and the control connector 60 of a fourth monitor 4' using cables, respectively. In other words, the video connectors 50 and the control connectors 60 of the four monitors 1', 2', 3' and 4' constituting the video wall 101 are connected to each other by a loop-out method.

Further, the second and fourth monitors 2' and 4' on the top side and the right side of the first monitor 1', respectively, are connected to the first monitor 1' through detecting connectors 40-2 and 40-4 thereof. In other words, a top detecting connector 40-1 of the first monitor 1' is connected to a bottom detecting connector 40-2 of the second monitor 2'. And, a right detecting connector 40-3 of the first monitor 1' is connected to a left detecting connector 40-4 of the fourth monitor 4'. Further, a right detecting connector 40-3 of the second monitor 2' is connected to a left detecting connector 40-4 of the third monitor 4', and a top detecting connector 40-1 of the fourth monitor 4' is connected to a bottom detecting connector 40-2 of the third monitor 3'. The detecting connectors 40-1, 40-2, 40-3 and 40-4 between neighboring monitors 1', 2' 3' and 4' may be connected to each other by using cables or by directly coupling the detecting connectors 40-1, 40-2, 40-3 and 40-4 of corresponding monitors 1', 2' 3' and 4' without the use of cables. In FIG. 3, the detecting connectors 40-1, 40-2, 40-3 and 40-4 of corresponding monitors 1', 2' 3' and 4' are connected to each other using the cables.

Figure 4:
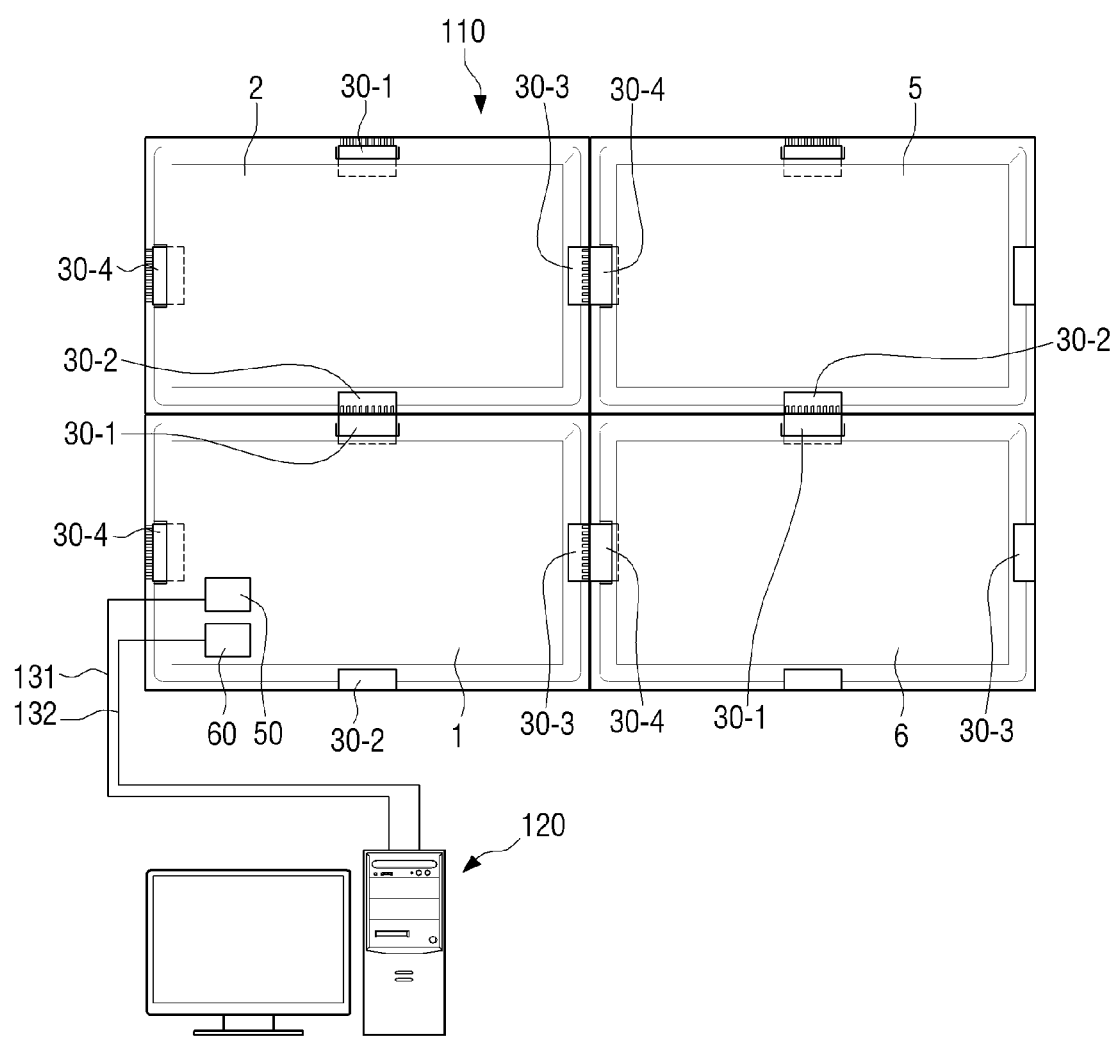
FIG. 4 is a rear view illustrating a video wall system including a plurality of monitors connected by combined connectors according to an aspect of an exemplary embodiment.

The detecting connectors 40-1, 40-2, 40-3 and 40-4 may be disposed on the four side surfaces of the monitor 1' separately from the video connector 50, as illustrated in FIG. 3. However, alternatively, the detecting connectors 40-1, 40-2, 40-3 and 40-4 may be formed integrally with connectors for other terminals. For example, as illustrated in FIG. 4, combined connectors 30-1, 30-2, 30-3 and 30-4 including input-output terminals for video signals, communication, etc., are disposed on the top and bottom surfaces and the left and right side surfaces of the monitor 1, and two terminals for detecting members are provided in the combined connectors 30-1, 30-2, 30-3 and 30-4. If terminals for other signals and the terminals for the detecting member are provided in a single connector as described above, separate cables to connect the terminals for detecting members are not required, as the terminals for detecting members of the two neighboring monitors can be connected by connection of the combined connectors. In this case, it is convenient to connect the terminals for detecting members.

FIG. 4 is a rear view illustrating a video wall system 100 including a plurality of monitors 1 to 12 including the combined connectors 30-1, 30-2, 30-3 and 30-4 that the detecting member is integrated into, the combined connectors 30-1, 30-2, 30-3 and 30-4 including video signal terminals, etc. Referring to FIG. 4, the combined connectors 30-1, 30-2, 30-3 and 30-4 are disposed on the top and bottom surfaces and the left and right side surfaces of the monitors 1, 2, 5 and 6, respectively. The combined connectors 30-1, 30-2, 30-3 and 30-4 include input-output terminals for video signals, input-output terminals for audio signals, input-output terminals for monitor control signals, and detecting terminals to perform an operation of the detecting member. The first monitor 1 connected to the control computer 120 is provided with a control connector 60 and a video connector 50 to be connected to the control computer 120. The control connector 60 is connected to the control computer 120, for example, by a cable for RS-232C or RJ45, and may include terminals for transmitting and receiving signals for controlling the monitor. The video connector 50 may include terminals for receiving video and audio signals to be displayed on the monitors 1 to 12 from the control computer 120.

The second and sixth monitors 2 and 6, which are at the top and right side of the first monitor 1, respectively, are connected to the first monitor 1 through the combined connectors 30-1, 30-2, 30-3 and 30-4. In other words, a top combined connector 30-1 of the first monitor 1 is connected to a bottom combined connector 30-2 of the second monitor 2. Furthermore, a right combined connector 30-3 of the first monitor 1 is connected to a left combined connector 30-4 of the sixth monitor 6. Also, a right combined connector 30-3 of the second monitor 2 is connected to a left combined connector 30-4 of the fifth monitor 5, and a top combined connector 30-1 of the sixth monitor 6 is connected to a bottom combined connector 30-2 of the fifth monitor 5.

Alternatively, at least two combined connectors among the combined connectors 30-1, 30-2, 30-3 and 30-4 disposed on the four side surfaces of the monitors 1 to 12 may be disposed to slidably move in a straight line. For example, the top combined connector 30-1 and the left combined connector 30-4 of each of the monitors 1 to 12 may be formed in a sliding structure, and the bottom combined connector 30-2 and the right combined connector 30-3 may be formed in a fixed structure.

Figure 5A:
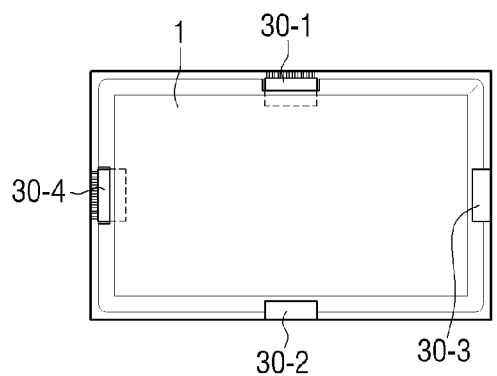
FIGS. 5A and 5B are views illustrating a monitor which is used in a video wall system connected by combined connectors according to another exemplary embodiment.
Figure 5B:
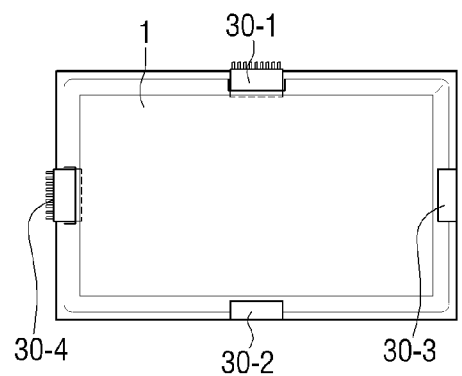

FIG. 5A illustrates when the top and left combined connectors 30-1 and 30-4 having the sliding structure do not project from the side surface of the monitor 1, and FIG. 5B illustrates when the top and left combined connectors 30-1 and 30-4 project from the side surface of the monitor 1. As illustrated in FIG. 5B, when the top combined connector 30-1 is moved upward, the top combined connector 30-1 projects from the top side of the monitor 1 and is connected to the bottom combined connector 30-2 of the monitor disposed on the top side of the monitor 1. Also, when the left combined connector 30-4 is moved to the left, the left combined connector 30-4 projects from the left side of the monitor 1 and is connected to the right combined connector 30-3 of the monitor disposed on the left side of the monitor 1.

The control portion 20 stores identification numbers of the monitors 1 to 12. If an identification number is called from the control computer 120, the control portion 20 outputs a signal corresponding to the called identification number. For example, when the control computer 120 calls up an identification number, the control portion 20 of a monitor having the called identification number among the monitors 1 to 12 outputs a response signal through the four detecting members 30-1, 30-2, 30-3 and 30-4. However, if the control computer 120 calls up another identification number different from the identification number of the monitor including the control portion 20, the control portion 20 checks whether or not a response signal is input through any of the four detecting members 30-1, 30-2, 30-3 and 30-4. If the response signal is input through one among the four detecting members 30-1, 30-2, 30-3 and 30-4, the control portion 20 generates a detecting signal including its identification number and location information of the detecting member 30-1, 30-2, 30-3 and 30-4 through which the response signal is input, and sends the generated detecting signal to the control computer 120.

The remaining structure of the monitors 1 to 12 may be the same as or similar to that of the related art monitor which receives image signals from the control computer 120 and displays images on a screen portion. Therefore, detailed descriptions thereof will be omitted.

The control computer 120 is configured to control the plurality of monitors 1 to 12 constituting the video wall 110. The control computer 120 can store or receive video signals for display on the video wall 110, and sends the video signals to the video wall 110. Further, a software program relating to an automatic detection method of a video wall arrangement which can automatically detect arrangement of the plurality of monitors 1 to 12 constituting the video wall 110 as described below may be installed in the control computer 120. The control computer 120 can be a related art personal computer, or may be implemented in a special-purpose computer.

Hereinafter, an automatic detection method of a video wall arrangement which can automatically detect an arrangement of a plurality of monitors of a video wall system according to an exemplary embodiment will be explained in detail with reference to FIGS. 6 and 7.

Figure 6:
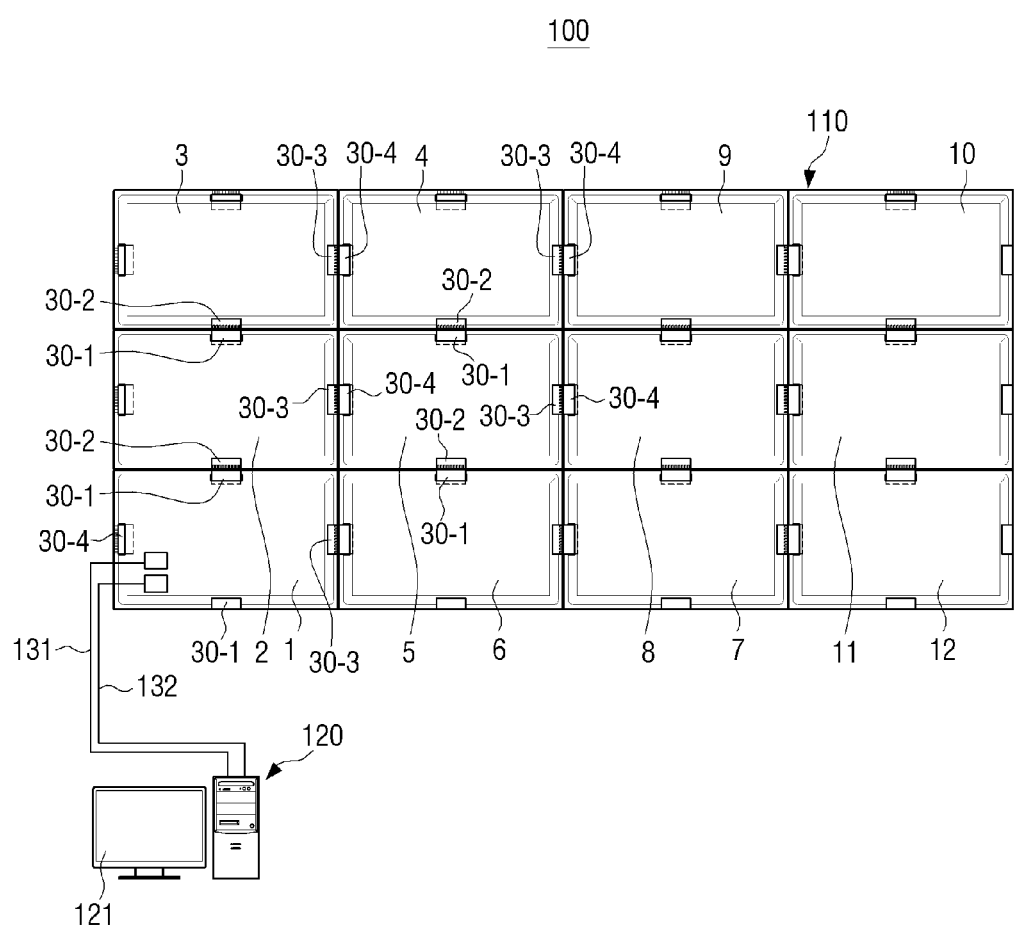
FIG. 6 is a rear view schematically illustrating a video wall system according to an exemplary embodiment.
Figure 7:
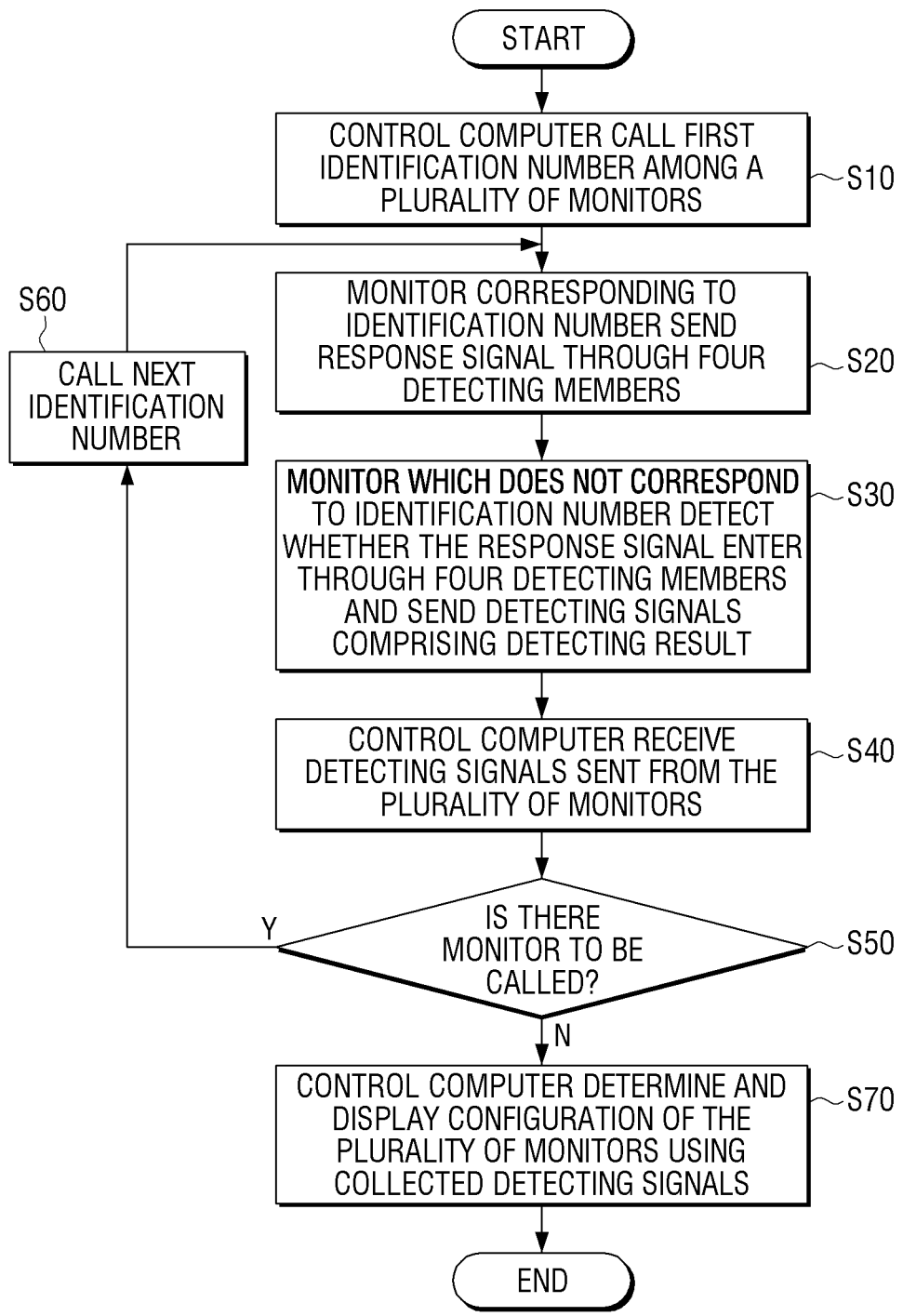
FIG. 7 is a flow chart illustrating an automatic detection method of a video wall arrangement according to an exemplary embodiment.

FIG. 6 is a rear view schematically illustrating a video wall system according to an exemplary embodiment, and FIG. 7 is a flow chart illustrating an automatic detection method of a video wall arrangement according to an exemplary embodiment.

Referring to FIG. 6, the video wall 110 to use the automatic detection method of the video wall arrangement according to an exemplary embodiment includes twelve monitors 1 to 12. The twelve monitors 1 to 12, that is, the first monitor 1 to the twelfth monitor 12, are connected to each other by the combined connectors 30-1, 30-2, 30-3 and 30-4 disposed on the top and bottom surfaces and the left and right side surfaces of each of the monitors 1 to 12. The first monitor 1 is connected to the control computer 120 via the video signal cable 131 and the communication cable 132. Accordingly, a user can send video signals to the first to twelfth monitors 1 to 12 via the control computer 120. Also, the user can individually control each of the first to twelfth monitors 1 to 12 by using a monitor control program installed in the control computer 120. In other words, the user uses the control computer 120 to individually adjust brightness, light and darkness, horizontal and vertical positions of a screen, etc., of each of the first to twelfth monitors 1 to 12.

For this, the control computer 120 matches the identification numbers and locations of the plurality of monitors 1 to 12 constituting the video wall 110. The control computer 120 can automatically detect an arrangement of the plurality of monitors 1 to 12 constituting the video wall 110 using a below-described method.

First, the control computer 120 sequentially calls up the identification numbers of the plurality of monitors 1 to 12 constituting the video wall 110. Then, a monitor corresponding to the called identification number among the plurality of monitors 1 to 12 sends a response signal, and the other monitors which do not correspond to the called identification number among the plurality of monitors 1 to 12 send detecting signals including information with respect to whether or not the response signal is received and a receiving direction of the response signal to the control computer 120.

Figure 8:
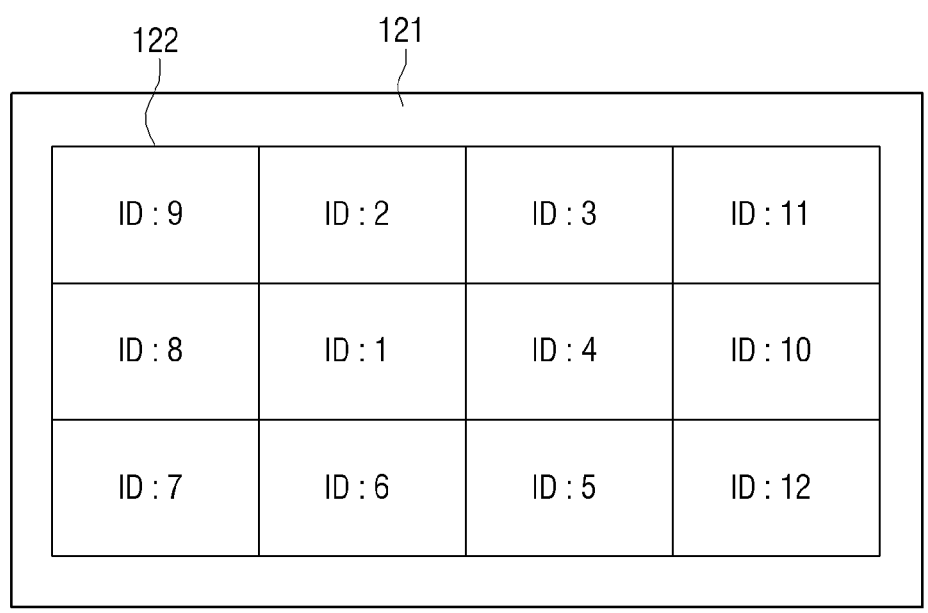
FIG. 8 is a view illustrating an example of a structure of a video wall displayed on a display screen of a control computer by an automatic detection method of a video wall arrangement according to an exemplary embodiment.

The control computer 120 receives the detecting signals sent from the plurality of monitors 1 to 12, and then recognizes an arrangement of the plurality of monitors 1 to 12 using the received detecting signals. After that, the control computer 120 displays the recognized arrangement of the plurality of monitors 1 to 12 on a display screen 121 of the control computer 120 as illustrated in FIG. 8. At this time, the identification number ID of each of the plurality of monitors 1 to 12 is displayed with an arrangement image 122 of the plurality of monitors 1 to 12 displayed on the control computer 120.

Hereinafter, a method for automatically detecting an arrangement of the plurality of monitors 1 to 12 constituting the video wall 110 using the identification numbers of the monitors 1 to 12 will be explained in detail with reference to FIG. 7.

The control computer 120 calls up a first identification number among the plurality of monitors 1 to 12 constituting the video wall 110. Here, the identification number ID is an identifier to distinguish the plurality of monitors 1 to 12 so each of the plurality of monitors 1 to 12 has a different number. The identification numbers corresponding to the plurality of monitors 1 to 12 may be set by the serial number. For example, when the video wall 110 includes twelve monitors 1 to 12 as illustrated in FIG. 6, the identification numbers of the plurality of monitors 1 to 12 are 1 to 12. The identification number of each of the monitors 1 to 12 may be set manually or automatically. After the video wall 110 is composed of the plurality of monitors 1 to 12 and connected to the control computer 120, the control computer 120 can automatically recognize the number of the plurality of monitors 1 to 12 constituting the video wall 110. Alternatively, the user can manually input the number of the plurality of monitors 1 to 12 constituting the video wall 110 into the control computer 120. In the present exemplary embodiment, since the video wall 110 is composed of twelve monitors 1 to 12, the identification numbers corresponding to each of the monitors 1 to 12 are exemplarily provided as 1 to 12. At this time, the control computer 120 does not know which of the monitors 1 to 12 corresponding to the identification numbers of 1 to 12 forms which portion of the video wall 110.

The control computer 120 according to the present exemplary embodiment performs the method described below to match the identification numbers of 1 to 12 and the plurality of monitors 1 to 12.

The control computer 120 calls up a first identification number, namely, the identification number ID 1 (operation S10). Then, the monitor 5 having the identification number 1 sends a response signal. At this time, the control portion 20 of the monitor 5 having the identification number of 1 sends the response signal for a predetermined time through the detecting members 30-1, 30-2, 30-3 and 30-4 disposed on the four side surfaces of the monitor 5 (operation S20). For example, the control portion 20 can send a high signal as the response signal for a predetermined time. In other words, the response signal may be a high pulse signal. Alternatively, the control portion 20 can send a low signal as the response signal for a predetermined time.

When the monitor 5 of the identification number 1 sends the response signal, other monitors 1 to 4 and 6 to 12 disposed in the vicinity of the monitor 5 of the identification number 1, that is, the monitors 1 to 4 and 6 to 12 of which the identification number is not 1, check whether or not the response signal emitted from the monitor 5 of the identification number 1 enters through the detecting members disposed in the combined connectors 30-1, 30-2, 30-3 and 30-4.

For example, in the video wall 110 illustrated in FIG. 6, if the fifth monitor 5 is the monitor of the identification number 1, the control portion 20 of the fifth monitor 5 sends the response signal through the detecting members of the combined connectors 30-1, 30-2, 30-3 and 30-4 disposed on the four side surfaces of the fifth monitor 5 according to a call of the control computer 120.

Then, the first to fourth monitors 1 to 4 and the sixth to twelfth monitors 6 to 12 of which the identification number is not 1 detect whether the response signal enters through the detecting members of the combined connectors 30-1, 30-2, 30-3 and 30-4 or not, and then sends the result as a detecting signal (operation S30).

Specifically, the response signal enters the monitors 2, 4, 6, and 8 disposed in the vicinity of the fifth monitor 5, that is, the fourth monitor 4 and sixth monitor 6 disposed respectively on the top and bottom sides of the fifth monitor 5 and the second monitor 2 and eighth monitor 8 disposed respectively on the left and right sides of the fifth monitor 5 through the detecting members of the combined connectors 30-1, 30-2, 30-3 and 30-4 connected to the fifth monitor 5. In other words, since the second monitor 2 disposed on the left side of the fifth monitor 5 is connected to the fifth monitor 5 through the right combined connector 30-3 of the second monitor 2, the response signal emitted from the fifth monitor 5 of the identification number 1 enters the second monitor 2 through the detecting member of the right combined connector 30-3. As a result, the control portion 20 of the second monitor 2 can know that the monitor 5 corresponding to the identification number 1 is positioned at the right side of the second monitor 2. Accordingly, the control portion 20 of the second monitor 2 sends a detecting signal including its identification number and information indicating that the response signal of the monitor 5 having the identification number 1 is received from the right side of the second monitor 2, namely, location information of the monitor 5 having the identification number 1. For example, if the identification number of the second monitor 2 is 8, the control portion 20 of the second monitor 2 sends the detecting signal including information of 'ID 8/right side' to the control computer 120.

Since the fourth monitor 4 disposed on the top side of the fifth monitor 5 is connected to the fifth monitor 5 through the bottom combined connector 30-2 of the fourth monitor 4, the response signal emitted from the fifth monitor 5 is received by the fourth monitor 4 through the detecting member of the bottom combined connector 30-2 of the fourth monitor 4. As a result, the control portion 20 of the fourth monitor 4 can know that the monitor 5 corresponding to the identification number 1 is positioned at the bottom side of the fourth monitor 4. Accordingly, if the identification number of the fourth monitor 4 is 2, the control portion 20 of the fourth monitor 4 sends the detecting signal including information of 'ID 2/bottom side' to the control computer 120.

Since the eighth monitor 8 disposed on the right side of the fifth monitor 5 is connected to the fifth monitor 5 through the left combined connector 30-4 of the eighth monitor 8, the response signal emitted from the fifth monitor 5 is received by the eighth monitor 8 through the detecting member of the left combined connector 30-4 of the eighth monitor 8. As a result, the control portion 20 of the eighth monitor 8 can know that the fifth monitor 5 corresponding to the identification number 1 is positioned at the left side of the eighth monitor 8. Accordingly, if the identification number of the eighth monitor 8 is 4, the control portion 20 of the eighth monitor 8 sends the detecting signal including information of 'ID 4/left side' to the control computer 120.

Since the sixth monitor 6 disposed on the bottom side of the fifth monitor 5 is connected to the fifth monitor 5 through the top combined connector 30-1 of the sixth monitor 6, the response signal emitted from the fifth monitor 5 is received by the sixth monitor 6 through the detecting member of the top combined connector 30-1 of the sixth monitor 6. As a result, the control portion 20 of the sixth monitor 6 can know that the monitor 5 corresponding to the identification number 1 is positioned at the top side of the sixth monitor 6. Accordingly, if the identification number of the sixth monitor 6 is 6, the control portion 20 of the sixth monitor 6 sends the detecting signal including information of 'ID 6/top side' to the control computer 120.

The other monitors 1, 3, 7, 9, 10, 11 and 12 that are not directly connected to the fifth monitor 5, that is, the first, third, seventh, ninth, tenth, eleventh and twelfth monitors 1, 3, 7, 9, 10, 11 and 12, do not receive the response signal. In this case, the monitors 1, 3, 7, 9, 10, 11 and 12 may send detecting signals including only their identification numbers. Alternatively, the monitors 1, 3, 7, 9, 10, 11 and 12 not to receive the response signal may not send the detecting signal.

The control computer 120 receives the detecting signals sent from the plurality of monitors 1 to 12 (operation S40). Based on the received detecting signals, the control computer 120 arranges the monitors 2, 4, 6 and 8 around the monitor 5 of the identification number 1.

The control computer 120 determines whether the monitors should be called up or not (operation S50). If there is at least one monitor to be called up, the control computer 120 calls up an identification number of a next monitor (operation S60).

In the present exemplary embodiment, since the video wall 110 is composed of twelve monitors 1 to 12, the control computer 120 determines that there are next monitors 2 to 12 and calls up the next identification number, that is, the identification number 2. Then, the monitor 4 corresponding to the identification number 2 sends a response signal through the detecting members of the combined connectors 30-1, 30-2, 30-3 and 30-4 disposed on the four side surfaces of the monitor 4.

Then, the other monitors 1 to 3 and 5 to 12 located in the vicinity of the monitor 4 of the identification number 2 check whether the response signal is received or not, and send detecting signals including the check result to the control computer 120.

For example, if the fourth monitor 4 is the monitor of the identification number 2, the fourth monitor 4 emits the response signal. Then, the response signal is received by the third, fifth and ninth monitors 3, 5 and 9 disposed in the vicinity of the fourth monitor 4. In other words, since the third monitor 3 disposed on the left side of the fourth monitor 4 is connected to the fourth monitor 4 through the right combined connector 30-3 of the third monitor 3, the response signal emitted from the fourth monitor 4 of the identification number 2 is received by the third monitor 3 through the detecting member of the right combined connector 30-3. As a result, the control portion 20 of the third monitor 3 can know that the monitor 4 corresponding to the identification number 2 is positioned at the right side of the third monitor 3. Accordingly, the control portion 20 of the third monitor 3 sends a detecting signal including its identification number and information indicating that the response signal of the monitor 4 having the identification number 2 is received from the right side of itself, namely, location information of the fourth monitor 4 of the identification number 2 to the control computer 120. For example, if the identification number of the third monitor 3 is 9, the control portion 20 of the third monitor 3 sends the detecting signal including information of 'ID 9/right side' to the control computer 120.

Since the fifth monitor 5 disposed on the bottom side of the fourth monitor 4 is connected to the fourth monitor 4 through the top combined connector 30-1 of the fifth monitor 5, the response signal emitted from the fourth monitor 4 is received by the fifth monitor 5 through the detecting member of the top combined connector 30-1 of the fifth monitor 5. As a result, the control portion 20 of the fifth monitor 5 can know that the fourth monitor 4 corresponding to the identification number 2 is positioned at the top side of the fifth monitor 5. Accordingly, since the identification number of the fifth monitor 5 is 1, the control portion 20 of the fifth monitor 5 sends the detecting signal including information of 'ID 1/top side' to the control computer 120.

Since the ninth monitor 9 disposed on the right side of the fourth monitor 4 is connected to the fourth monitor 4 through the left combined connector 30-4 of the ninth monitor 9, the response signal emitted from the fourth monitor 4 is received by the ninth monitor 9 through the detecting member of the left combined connector 30-4 of the ninth monitor 9. As a result, the control portion 20 of the ninth monitor 9 can know that the fourth monitor 4 corresponding to the identification number 2 is positioned at the left side of the ninth monitor 9. Accordingly, if the identification number of the ninth monitor 9 is 3, the control portion 20 of the ninth monitor 9 sends the detecting signal including information of 'ID 3/left side' to the control computer 120.

The control computer 120 receives the detecting signals which the first to twelfth monitors 1 to 12 send corresponding to the calling signal of the identification number 2, and checks whether or not the monitor 4 of the identification number 2 is included in monitor information stored in the control computer 120. If the monitor 4 of the identification number 2 is included in the stored monitor information, the control computer 120 arranges the other monitors around the monitor 4 based on the newly received information. If there is no monitor information corresponding to the identification number 2, the control computer 120 may search the information matched to the information relating to the identification numbers stored in the control computer 120 from the newly received information relating to the identification numbers of the monitors, and arrange other monitors around the monitor corresponding to the searched identification number information.

The control computer 120 sequentially calls up the identification numbers from 3 to 12. Then, in response to the calling signals, the plurality of monitors 1 to 12 sequentially send the detecting signal including location information of the monitor corresponding to the called identification number to the control computer 120.

The control computer 120 arranges the plurality of monitors 1 to 12 using the detecting signals which the plurality of monitors 1 to 12 sequentially send corresponding to the identification numbers 3 to 12. Based on the arranged plurality of monitors 1 to 12, the control computer 120 displays an image of the video wall 110 of which arrangement is completed on the display screen 121 thereof (operation S70). At this time, as illustrated in FIG. 8, the identification number of each of the plurality of monitors 1 to 12 constituting the video wall 110 may be displayed with an image portion presenting each of the plurality of monitors 1 to 12. FIG. 8 shows an image of the arrangement which the control computer 120 displays on the display screen 121 thereof after the control computer 120 has completed the arrangement of the plurality of monitors 1 to 12. From the image the user can understands that the plurality of monitors 1 to 12 is arranged in 3×4 and forms a rectangular shape, and the location on the video wall 110 of the monitors 1 to 12 corresponding to the identification numbers of 1 to 12.

Figure 9:
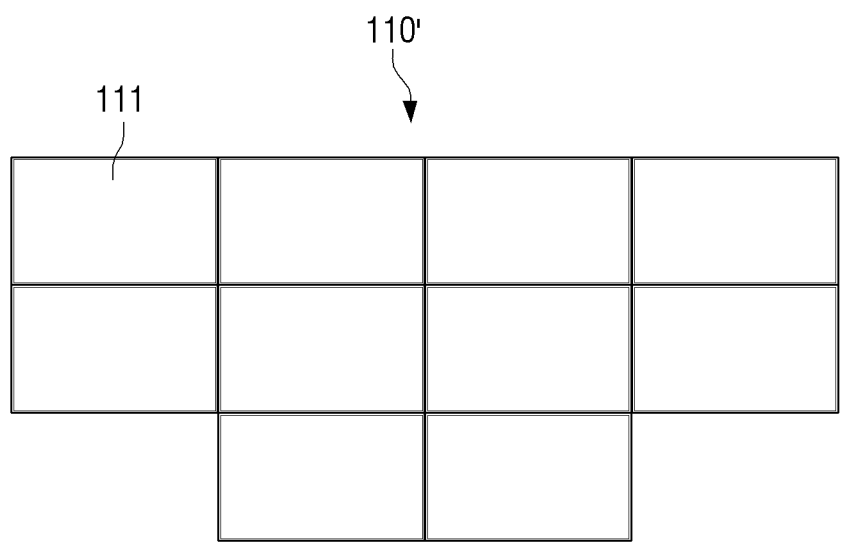
FIG. 9 is a view illustrating an irregular video wall having an arrangement of a plurality of monitors that can be automatically recognized by an automatic detection method of a video wall arrangement according to an exemplary embodiment.
Figure 10:
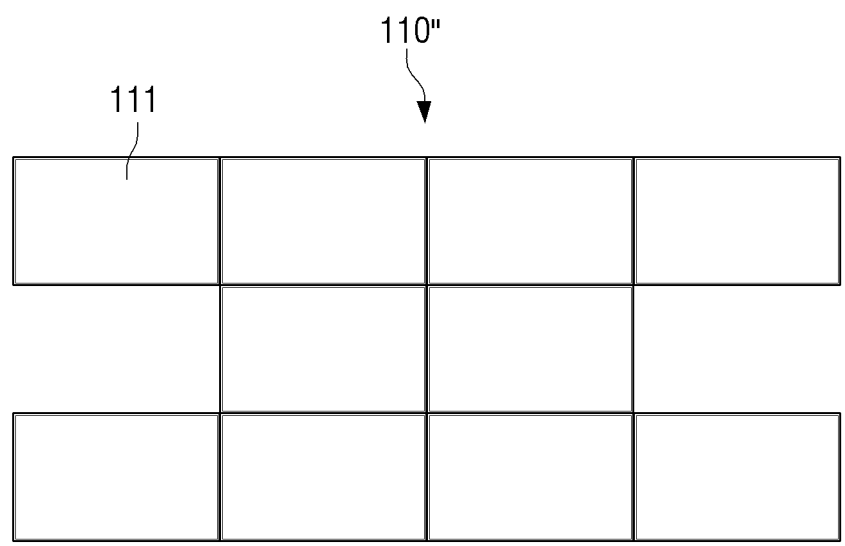
FIG. 10 is a view illustrating an example of an irregular video wall according to another exemplary embodiment.

As described above, since the automatic detection method of the video wall arrangement according to an exemplary embodiment can automatically detect an arrangement of a plurality of monitors using identification numbers, even when the plurality of monitors 111 form an irregular video wall 110' and 110" as illustrated in FIGS. 9 and 10, the automatic detection method according to an exemplary embodiment can automatically detect the arrangement of the plurality of monitors 111. Here, the irregular video wall 110' and 110" is a video wall including a plurality of monitors which are not arranged in a rectangular shape as illustrated in FIGS. 9 and 10.

With the automatic detection method of a video wall arrangement according to an exemplary embodiment and the video wall system using the same, since the user does not need to install the plurality of monitors constituting the video wall in order of the identification number, installation of the video wall is easy.

Also, since after installing the video wall, the user does not need to check relationships between the identification numbers and locations of the plurality of monitors constituting the video wall and perform a one-to-one match thereof, installation of the video wall is easy.

Also, according to one or more exemplary embodiments, even when the configuration of the video wall is changed, the control computer can automatically recognize the configuration shape of the video wall and the identification numbers and locations of the plurality of monitors and display the recognized result on the display screen. Therefore, it is easy to change the configuration of the video wall.

While not restricted thereto, an exemplary embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, it is understood that in exemplary embodiments, one or more units of the above-described apparatuses and devices can include circuitry, a processor, a microprocessor, etc., and may execute a computer program stored in a computer-readable medium.

While exemplary embodiments have been described, additional variations and modifications of exemplary embodiments may occur to those skilled in the art once they learn of the basic inventive concepts. Therefore, it is intended that the appended claims shall be construed to include both the above-described exemplary embodiments and all such variations and modifications that fall within the spirit and scope of the inventive concepts.

What is claimed is:

1. An automatic detection method of an arrangement of a video wall including a plurality of monitors, the automatic detection method comprising:
   sequentially outputting, by a control computer for controlling the plurality of monitors, a plurality of first signals, each of the plurality of first signals respectively corresponding to one of the plurality of monitors and comprising identification information of the one of the plurality of monitors;
   in response to each of the plurality of first signals, sequentially output by the control computer: a first monitor that corresponds to the identification information, sending a second signal, wherein the second signal is a response signal and is different from the plurality of first signals;
   in response to receiving the second signal, at least one second monitor that does not correspond to the identification information, sending to the control computer a third signal indicating a received direction of the response signal, wherein the third signal is a detecting signal and is different from the plurality of first signals and the second signal; and
   receiving, by the control computer, the third signal, such that, for each of the plurality of first signals sequentially output, the control computer receives at least one third signal; and
   the control computer determining an arrangement of the plurality of monitors according to the received third signals.

2. The automatic detection method of claim 1, further comprising displaying the determined arrangement of the plurality of monitors.

3. The automatic detection method of claim 1, wherein:
   each of the plurality of monitors comprises:
      a control portion to control the monitor, and
      four detecting members disposed on four side surfaces of the monitor; and
   the sending the second signal comprises the first monitor sending the second signal through each of the four detecting members.

4. The automatic detection method of claim 3, further comprising:
   the control portions of other monitors, among the plurality of monitors, which do not correspond to the identification information, determining whether or not the second signal is received through the four detecting members; and
   in response to the determining, by the second monitor, that the second signal is received through one of the four detecting members, the second monitor sending, to the control computer, location information of the one detecting member through which the second signal is received.

5. The automatic detection method of claim 4, wherein the third signal comprises identification information of the second monitor and the location information of the one detecting member through which the second signal is received.

6. The automatic detection method of claim 1, wherein a monitor that does not receive the second signal from among the plurality of monitors does not send the third signal.

7. The automatic detection method of claim 1, wherein the second signal comprises a high pulse signal.

8. A non-transitory computer readable recording medium having recorded thereon a program executable by a computer for performing the method of claim 1.

9. An automatic detection method of a video wall arrangement for a video wall system comprising a plurality of monitors and a control computer for controlling the plurality of monitors, the automatic detection method comprising:
   a) outputting, by the control computer, a first signal comprising identification information of a first monitor, from among the plurality of monitors;
   b) sending, by the first monitor, a second signal through four detecting members disposed on four side surfaces of the first monitor, in response to the signal output by the control computer, wherein the second signal is a response signal and is different from the first signal;
   c) detecting, by other monitors of the plurality of monitors which do not correspond to the identification information, whether the second signal is received through any of four detecting members disposed on four side surfaces of each of the other monitors, and sending, by the other monitors, third signals comprising detecting results to the control computer, wherein the third signals are detecting signals and are different from the first signal and the second signal;
   d) receiving, by the control computer, the detecting signals sent from the other monitors;
   e) repeating the operations a), b), c), and d) for each of a plurality of identification information corresponding to the plurality of monitors; and
   f) determining, by the control computer, an arrangement of the plurality of monitors based on the received third signals.

10. The automatic detection method of claim 9, wherein:
   the operation c) comprises a monitor that does not correspond to the identification information determining a detecting member, among the four detecting members, through which the second signal is received, and sending location information of the detecting member through which the second signal is received to the control computer.

11. The automatic detection method of claim 10, wherein the operation f) comprises the control computer using the identification information of the monitor that does not correspond to the identification information and the location information to determine the arrangement of the plurality of monitors.

12. A non-transitory computer readable recording medium having recorded thereon a program executable by a computer for performing the method of claim 9.

13. A video wall system comprising:
   a plurality of monitors constituting a video wall; and
   a control computer to control the plurality of monitors,
   wherein each of the plurality of monitors comprises:
      a control portion to control the monitor; and
      four detecting members disposed on four side surfaces of the monitor,
   wherein the control computer sequentially sends, to the plurality of monitors, a plurality of first signals, each of the plurality of signals comprising identification information of one of the plurality of monitors,
   wherein, in response to each of the plurality of first signals, sequentially set by the control computer, a first monitor, corresponding to the identification information, sends a second signal through the four detecting members, wherein the second signal is a response signal and is different from the plurality of first signals,
   wherein a second monitor, which does not correspond to the identification information, detects the second signal and, in response to detecting the second signal, sends, to the control computer, a third signal comprising location information of the first monitor corresponding to the identification information, wherein the third signal is a detecting signal and is different from the plurality of first signals and the second signal, and
   wherein the control computer is arranged to receive the third signals, to determine an arrangement of the plurality of monitors, and to display the arrangement of the plurality of monitors.

14. The video wall system of claim 13, wherein the control portion of the second monitor, which does not correspond to the identification information, determines whether the second signal is received through the four detecting members, and, in response to determining that the second signal is received through one of the four detecting members, sends, to the control computer, the third signal comprising location information of the one detecting member through which the second signal is received.

15. The video wall system of claim 14, wherein the third signal comprises the identification information of the second monitor, which does not correspond to the identification information, and the location information of the one detecting member through which the second signal is received.

16. The video wall system of claim 13, wherein a monitor which does not receive the second signal among the plurality of monitors does not send the third signal.

17. The video wall system of claim 13, wherein
   the four detecting members are in individual connectors separated from connectors for audio/video signals and monitor control signals.

18. The video wall system of claim 13, wherein the four detecting members are integrally provided with connectors for at least one of audio/video signals and monitor control signals.

19. The video wall system of claim 18, wherein at least two detecting members among the four detecting members are disposed in connectors which are horizontally or vertically movable.

20. An automatic detection method of an arrangement of a video wall including a plurality of monitors, the automatic detection method comprising:
   sequentially outputting, by a control computer for controlling the plurality of monitors, a plurality of first signals, each of the plurality of first signals respectively corresponding to one of the plurality of monitors and comprising identification information of the one of the plurality of monitors;
   for each of the plurality of first signals, sequentially output by the control computer, the control computer receiving a third signal from at least one second monitor, from among the plurality of monitors, that does not correspond to the identification information, the third signal indicating a received direction of a second signal received by the at least one second monitor from the first monitor in response to the outputting the first signal by the control computer, wherein the second signal is a response signal and is different from the plurality of first signals, and the third signal is a detecting signal and is different form the plurality of first signals and the second signal; and the control computer determining an arrangement of the plurality of monitors according to the received third signals.

21. The automatic detection method of claim 20, wherein the third signal comprises identification information of the second monitor and location information of a detecting member of the second monitor through which the second signal is received.

22. A non-transitory computer readable recording medium having recorded thereon a program executable by a computer for performing the method of claim 20.

23. An automatic detection method of an arrangement of a video wall including a plurality of monitors, the automatic detection method comprising:
sequentially, for each monitor of the plurality of monitors receiving, from a control computer for controlling the plurality of monitors, a first signal comprising identification information corresponding to the monitor, and in response to the receiving the identification information, sending, by the monitor, a second signal indicating that the identification information corresponds to the monitor, wherein the second signal is a response signal and is different from the first signal; and
each monitor of the plurality of monitors, in response to receiving a second signal from another monitor of the plurality of monitors, sending, to the control computer, a third signal indicating a direction from which the second signal was received, wherein the third signal is a detecting signal and is different from the first signal and the second signal,
wherein the control computer is arranged to receive the third signals to determine an arrangement of the plurality of monitors, and to display the arrangement of the plurality of monitors.

24. The automatic detection method of claim 23, wherein the third signal comprises identification information of the monitor and location information of a detecting member of the monitor through which the second signal is received.

25. A non-transitory computer readable recording medium having recorded thereon a program executable by a computer for performing the method of claim 23.

\* \* \* \* \*